US008422587B2

(12) United States Patent
Calderbank et al.

(10) Patent No.: US 8,422,587 B2
(45) Date of Patent: Apr. 16, 2013

(54) COMBINED CHANNEL CODING AND SPACE-TIME BLOCK CODING IN A MULTI-ANTENNA ARRANGEMENT

(75) Inventors: Arthur Robert Calderbank, Princeton, NJ (US); Ayman Naguib, New Providence, NJ (US); Nambirajan Seshadri, Chatham, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 13/365,079

(22) Filed: Feb. 2, 2012

(65) Prior Publication Data

US 2012/0134436 A1     May 31, 2012

Related U.S. Application Data

(63) Continuation of application No. 12/616,628, filed on Nov. 11, 2009, now Pat. No. 8,139,695, which is a continuation of application No. 12/316,067, filed on Dec. 9, 2008, now Pat. No. 7,643,589.

(51) Int. Cl.
    *H04L 27/00* (2006.01)
(52) U.S. Cl.
    USPC ............................. 375/299; 375/260; 375/347
(58) Field of Classification Search .................. 375/260, 375/299, 347
    See application file for complete search history.

(56) References Cited

U.S. PATENT DOCUMENTS

| 5,544,328 | A | 8/1996 | Seshadri |
| 5,931,968 | A | 8/1999 | Gray |
| 6,009,130 | A | 12/1999 | Lurey et al. |
| 6,088,408 | A | 7/2000 | Calderbank et al. |
| 6,127,971 | A | 10/2000 | Calderbamk et al. |
| 6,128,330 | A | 10/2000 | Schilling |
| 6,144,711 | A | 11/2000 | Raleigh et al. |
| 6,173,005 | B1 | 1/2001 | Kotzin |

(Continued)

FOREIGN PATENT DOCUMENTS

| WO | WO9741670 | 6/1997 |
| WO | WO 9923766 | 5/1999 |

OTHER PUBLICATIONS

Paulraj, A.J. etr al, "Space time processing for wiereless communications," 1997, Signal Processing Megazine, IEEE, vo. 14, pp. 49-83.*

(Continued)

*Primary Examiner* — Kevin Kim
(74) *Attorney, Agent, or Firm* — Zagorin O'Brien Graham LLP

(57) ABSTRACT

Enhanced performance is achieved by combining channel coding with the space-time coding principles. With K synchronized terminal units transmitting on N antennas to a base station having $M \geq K$ receive antennas, increased system capacity and improved performance are attained by using a concatenated coding scheme where the inner code is a space-time block code and the outer code is a conventional channel error correcting code. Information symbols are first encoded using a conventional channel code, and the resulting signals are encoded using a space-time block code. At the receiver, the inner space-time block code is used to suppress interference from the other co-channel terminals and soft decisions are made about the transmitted symbols. The channel decoding that follows makes the hard decisions about the transmitted symbols. Increased data rate is achieved by, effectively, splitting the incoming data rate into multiple channels, and each channel is transmitted over its own terminal.

9 Claims, 2 Drawing Sheets

U.S. PATENT DOCUMENTS

| | | |
|---|---|---|
| 6,185,258 B1 | 2/2001 | Alamouti et al. |
| 6,188,736 B1 | 2/2001 | Lo et al. |
| 6,198,775 B1 | 3/2001 | Khayrallah et al. |

OTHER PUBLICATIONS

Bernstein et al, "Space-time processing for increased capacity of wireless CDMA," 1996, Communications ICC 96, Conference Record, Converging Technologies for Tomorrow's Applications, vol. 1, pp. 597-601.*

Naguib et al "space-time coded modulation for high data rate wireless communications," Global Telecommunicaitons Conf. Nov. 1997, pp. 102-109.

Tarokh et al "space-time codes for high data rate wireless communication: performance criterion and code construction" IEEE Trans, on Info Theory, IEEE, vol. 44, No. 2, Mar. 1998.

Kousa M.A. et al. "Multichannel adaptive forward error-correction system." IEEE Proceedings, Part I (Communications, Speech and Vision), vol. 140, No. 5, Oct. 1993, pp. 357-364, IEEE, UK.

* cited by examiner

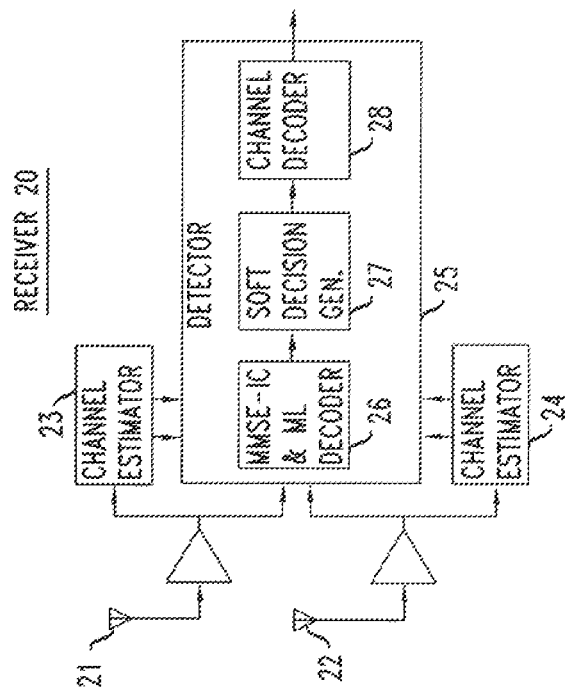
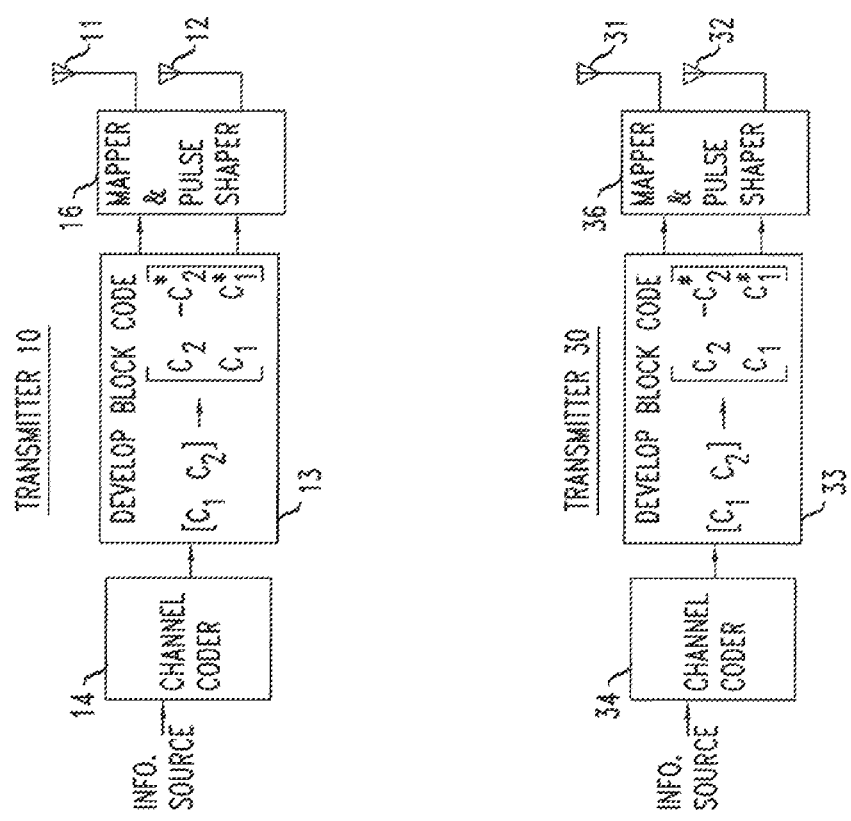

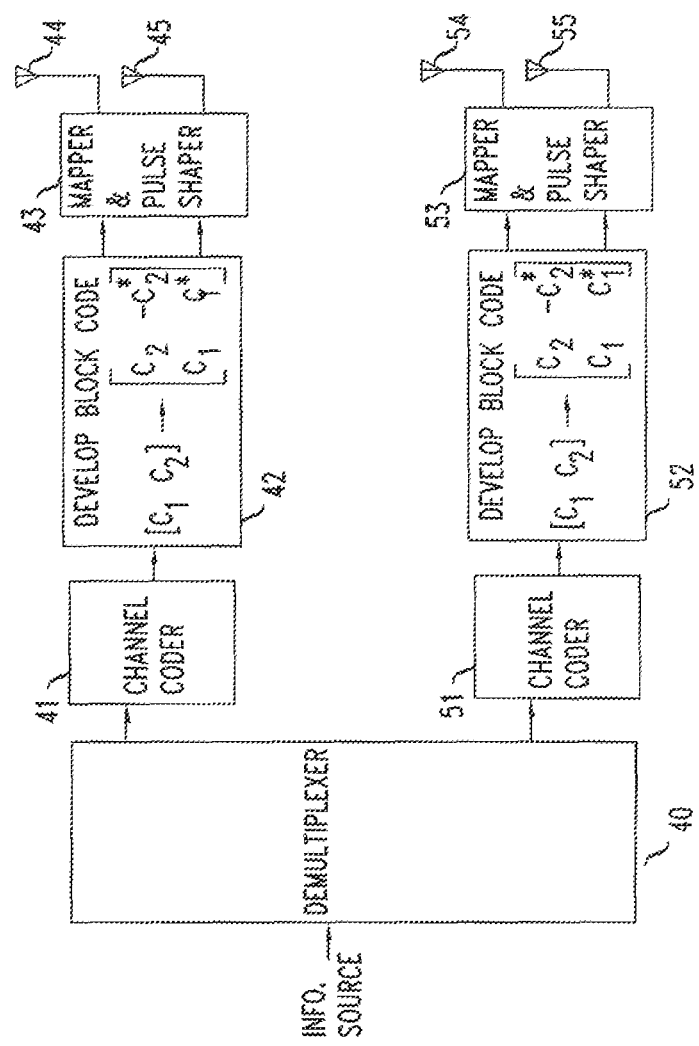

COMBINED CHANNEL CODING AND SPACE-TIME BLOCK CODING IN A MULTI-ANTENNA ARRANGEMENT

REFERENCE TO RELATED APPLICATIONS

This application is a continuation of U.S. application Ser. No. 12/616,628, filed Nov. 11, 2009 now U.S. Pat. No. 8,139,695 which application is a continuation of U.S. application Ser. No. 12/316,067, filed Dec. 9, 2008, now U.S. Pat. No. 7,643,589, which claims benefit of U.S. application Ser. No. 11/728,793, filed Mar. 27, 2007, now U.S. Pat. No. 7,463,705, which, in turn, claims benefit of U.S. application Ser. No. 09/300,494, filed Apr. 28, 1999, now U.S. Pat. No. 7,215,718, which also claims the benefit of U.S. Provisional Application No. 60/099,212, filed Sep. 4, 1998. This application is also related to U.S. Pat. Nos. 6,185,258, 6,178,196, and 6,127,971.

BACKGROUND OF THE INVENTION

This invention relates to wireless communication and, more particularly, to techniques for effective wireless communication in the presence of fading, co-channel interference, and other degradations.

Physical limitations of wireless channels present a fundamental technical challenge to reliable communication. Bandwidth limitations, propagation loss, time variance, noise, interference, and multipath fading make the wireless channel a narrow "pipe" that does not easily accommodate the flow of data. Further challenges come from power limitation, size, and speed of devices that are employed within portable wireless apparatus.

Employing multiple transmit antennas at both the base and the remote stations increases the capacity of wireless channels, and information theory provides a measure of this increase. The standard approach to exploit this capacity is linear processing at the receiver, as described, for example, by J. Winters, J. Salz and R. D. Gitlin, in "The impact of antenna diversity an the capacity of wireless communication systems" *IEEE Trans. Communications, Vol.* 42. No. 2/3/4, pp. 1740-1751, February/March/April 1994. Transmit diversity has been explored by Wittneben in "Base station modulation diversity for digital SIMULCAST," *Proc. IEEE'VTC*, pp. 505-511, May 1993, and by Seshadri and Winters in "Two signaling schemes for improving the error performance of frequency-division-duplex (FDD) transmission systems using transmitter antenna diversity," *International Journal of Wireless Information Networks*, Vol. 1, No. 1, 1994. The Wittneben and Seshadri et al papers approach transmit diversity from a signal processing point of view.

Space-time codes combine signal processing at the receiver with coding techniques appropriate to multiple transmit antennas. See, for example, V. Tarokh, N. Seshadri, and A. R. Calderbank in "Space-Time Codes For High Data Rate Wireless Communication: Performance Analysis and Code Construction," *IEEE Trans. Info. Theory*, Vol. 44, No. 2, pp. 744-765, March 1998. The space-time approach provides significant gain over the aforementioned prior art. Specific space-time codes designed for 2-4 transmitting antennas perform well in slowly varying fading environments (such as indoor transmission) and come within 2-3 dB of the theoretical outage capacity. Outage capacity is described, for example, by J. Foschini, Jr. and M. J. Gans, "On limits of wireless communication in a fading environment, when using multiple antennas," *Wireless Personal Communication*, Vol. 6, No. 3, pp. 311-335, March 1998. The bandwidth efficiency of the codes described in the Tarokh et al paper is about 3-4 times that of the current systems. The most important contributor to the improved performance is diversity, which may be thought of as providing a number of replicas of the transmitted signal to the receiver, with some replicas being less attenuated by fading. The space-time codes presented in the Tarokh et al paper provide an optimized trade-off between constellation size, data rate, diversity gain, and trellis complexity.

When the number of transmit-antennas is fixed, decoding complexity (measured, for example, by the number of trellis states in the decoder) increases exponentially with transmission rate. This can be refined to some extent by designing space-time codes with a multi-level structure and adopting multi-stage decoding, as described by Tarokh et al. For a moderate number of transmit antennas (3-6), this method provides higher data rates while reducing the decoding complexity. However, there is a penalty to be paid for simplified decoding. Multi-stage decoding is sub-optimal, due in part to magnification in the error coefficient, and this performance penalty means that alternative solutions are needed for achieving very high data rates.

In order to achieve very high data rates on narrowband wireless channels, many antennas are needed at both the transmitter and the receiver. Consider a wireless communication system employing n transmit and m receive antennas, where the subchannel between each transmit and receive antenna is quasi-static Rayleigh, flat, and independent of others. If n is fixed, then the capacity increases logarithmically with m. On the other hand, if m is fixed then intuition suggests that there must come a point where adding more transmit antennas will not make much difference. Indeed, this can be seen in the mathematics of outage capacity, shown by Foschini and Gans in the aforementioned paper. Thus, it turns out that in the presence of one receive antenna little can be gained in terms of outage capacity by using more than 4 transmit antennas. A similar argument shows that if there are two receive antennas, using 6 transmitting antennas provides almost all of the capacity increase that can be obtained.

If n increases and $m \geq n$, then information theory shows that the capacity of the system increases at least linearly as a function of n. Thus, it makes sense to increase the number of antennas at both receiver and transmitter in order to obtain higher capacities. Employing many antennas at both transmitter and receiver creates a multiple-input multiple-output system where the number of degrees of freedom is given by the product of the number of transmit and receive antennas.

Foschini considered such a system in "Layered space-time architecture for wireless communication in a fading environment when using multi-element antennas," *Bell Labs Technical Journal*, Vol. 1, No. 2, Autumn 1996. He proposed a multi-layered structure that, in principle, can achieve a tight lower bound on the capacity. If n transmit and n receive antennas are used, then at the receiver the transmitted signal from transmit antenna 1 is treated as the desired signal, while the signals transmitted from other transmit antennas are treated as interference. Linear processing is then used to suppress the interfering signals using n receive-antennas, providing a diversity gain of one. Once the signal transmitted from antenna 1 is correctly detected, the signal transmitted from antenna 2 is treated as the desired signal while the signals transmitted from transmit antennas 3, 4, . . . , n are treated as interference. The contribution of the signal transmitted from antenna 1, now that it has been detected, is subtracted from the signal received at receiver antennas 1 through n. Thereafter, detection of the signal transmitted by antenna 2 proceeds with linear processing that is applied to suppress the interfering signals from antennas 3 through n.

This provides a diversity gain of two. This process is repeated until all the transmitted signals are detected. Clearly, the worst case diversity in this architecture is one. For such a system, long frames of data combined with powerful coding techniques are needed to achieve the lower bound on outage capacity.

In the aforementioned U.S. Pat. No. 6,127,971, an arrangement is disclosed that provides enhanced performance which is realized by employing a perspective that combines array signal processing with channel coding. Specifically, antennas at the transmitter are partitioned into small groups, and individual space-time codes are used to transmit information from each group of antennas. At the receiver, an individual space-time code is decoded by a linear array processing technique that suppresses signals transmitted by other groups of antennas by treating them as interference. The contribution of the decoded signal to other received signal is then subtracted from those received signals. What results is a simple receiver structure that provides diversity and coding gain over uncoded systems with a given diversity gain. This combination of array processing at the receiver and coding techniques for multiple transmit antennas provides reliable and very high data rate communication over wireless channels. One advantage of the group interference suppression method over the Foschini architecture is that the number of receive antennas can be less than the number of transmit antennas.

In the aforementioned U.S. Pat. No. 6,178,196, an arrangement is disclosed wherein K synchronized terminal units transmit on N antennas to a base station having M≧K antennas. An improvement is achieved by employing both interference cancellation (IC) and maximum likelihood (ML) decoding. More specifically, space-time block coding is employed in transmitters that employ N transmit antennas each, and the signals are received in a receiver that employs M receiving antennas. By exploiting the structure of the space-time block code, K−1 interfering transmitting units are cancelled at the receiver, regardless of the number of transmitting antennas, N, when decoding the signals transmitted by a given mobile unit. Also disclosed is an arrangement where signals of a first terminal unit are decoded first, and the resulting decoded signals are employed to cancel their contribution to the signals received at the base station antennas while decoding the signals of the remaining K−1 terminal units. The process is repeated among the remaining K−1 terminal units.

SUMMARY OF THE INVENTION

Enhanced performance is achieved by combining channel coding with the space-time coding principles disclosed in the U.S. Pat. No. 6,178,196. More specifically, with K synchronized terminal units transmitting on N antennas to a base station having M≧K receive antennas, increased system capacity and improved performance are attained by using a concatenated coding scheme where the inner code is a space-time block code and the outer code is a conventional channel error correcting code. That is, information symbols are first encoded using a conventional channel code. The channel code is then encoded using a space-time block code, and transmitted over N antennas. At the receiver, the inner space-time block code is used to suppress interference from the other co-channel terminals and soft decisions are made about the transmitted symbols. The channel decoding that follows makes the hard decisions about the transmitted symbols.

Increased data rate is achieved by, effectively, splitting the incoming data rate into multiple channels, and each channel is transmitted over its own terminal. Viewed another way, information symbols from a transmitting terminal is split into L parallel streams. Stream l is encoded using a channel code with rate $R_l$ and then coded with a space-time block encoder with N transmitting antennas. Advantageously, the coding rates are chosen such that $R_1 < R_2 < \ldots < R_L$.

BRIEF DESCRIPTION OF THE DRAWING

FIG. 1 depicts an arrangement that, illustratively, includes a base station 30 with four antennas, a terminal units 20 with two antennas, and a terminal unit 20 with two antennas; and FIG. 2 illustrates a terminal unit that splits the input signal into two streams, and each stream is transmitted over a separate two-antenna arrangement.

DETAILED DESCRIPTION

FIG. 1 illustrates a unit 10 that employs a space-time block coding unit 13 that is followed by a conventional constellation mapper and pulse shaping circuit 16. The output of circuit 16 is fed to two transmitting antennas 11 and 12. The input symbols to the space-time block encoder are divided into groups of two symbols each, and at a given symbol period, the two symbols in each group $\{c_1, c_2\}$ are transmitted simultaneously from the two antennas. The signal transmitted from antenna 11 is $c_1$ and the signal transmitted from antenna 12 is $c_2$. In the next symbol period, the signal $-c_2^*$ is transmitted from antenna 11 and the signal $c_1^*$ is transmitted from antenna 12.

In receiver 20, signals are received by antennas 21 and 22 and are applied to detector 25. Channel estimators 23 and 24 operate on the incoming signal of antennas 21 and 24, respectively, in a conventional manner to develop estimates of the channel parameters. Those estimates are applied to detector 25. In the mathematical development of the algorithms disclosed herein, it is assumed that the channel from each of the two transmit antennas remains fixed over a two consecutive symbol periods. That is, $$h_i(nT) = h_i((n+1)T), i=1,2. \tag{1}$$

To ascertain the channel characteristics, the transmitter carries out a calibration session, during which pilot signals or tones are transmitted. It is the signals that are received during the calibration session that are utilized by the channel estimator circuits 23 and 24, which are well known circuits.

Maximum Likelihood Detection

The received signals at antenna 21 can be expressed as $$r_1 = h_1 c_1 + h_2 c_2 + \eta_1 \tag{2}$$

$$r_2 = -h_1 c_2^* + h_2 c_1^* + \eta_2, \tag{3}$$

where $r_1$ and $r_2$ are the received signals over two consecutive symbol periods, $h_1$ denotes the fading channel between transmit antenna 11 and receive antenna 21, $h_2$ denotes channel between transmit antenna 12 and receive antenna 21, and $\eta_1$ and $\eta_2$ are noise terms, which are assumed to be complex Gaussian random variables with zero mean and power spectral density $N_0/2$ per dimension. Defining the vectors $r = [r_1 r_2^*]^T$, $c = [c_1 c_2]^T$, and $\eta = [\eta_1 \eta_2^*]^T$, equations (2) and (3) can be rewritten in a matrix form as $$r = H \cdot c + \eta. \tag{4}$$

where the channel matrix H is defined as $$H = \begin{bmatrix} h_1 & h_2 \\ h_2^* & -h_1^* \end{bmatrix}. \quad (5)$$

The vector η is a complex Gaussian random vector with zero mean and covariance $N_0 \cdot I$. Defining C as the set of all possible symbol pairs $c=\{c_1, c_2\}$, and assuming that all symbol pairs are equi-probable, it can be easily shown that the optimum maximum likelihood (ML) decoder selects from C the symbol pair ĉ that minimizes the expression $\|r - H \cdot \hat{c}\|^2$. This can be written as $$\hat{c} = \underset{\hat{c} \in C}{\operatorname{argmin}} \|r - H \cdot \hat{c}\|^2. \quad (6)$$

It was shown by S. Alamouti in "Space Block Coding: A simple Transmitter Diversity Scheme for wireless Communications," submitted to IEEE JSAC, September 1997, that the diversity order of the above space-time block code is equivalent to that of a two branch maximal ratio receive combining (MRRC). Alamouti also showed that, because of the orthogonality of the matrix H, this decoding rule decomposed into two separate decoding rules for $c_1$ and $c_2$. The uncertainty, $\Delta_c$, of the decoded symbols ĉ is defined as $$\Delta_c = \|r - H \cdot \hat{c}\|^2. \quad (7)$$

The maximum likelihood (ML) rule of equation (6) can be simplified by realizing that the channel matrix H is orthogonal; that is, that $H^*H = (|h_1|^2 + |h_2|^2)I$. This yields a modified received vector, $$\tilde{r} = H^* r = (|h_1|^2 + |h_2|^2) \cdot c + \tilde{\eta}, \quad (8)$$

where $\tilde{\eta} = H^* \eta$. This leads to $$\hat{c} = \underset{\hat{c} \in C}{\operatorname{argmin}} \|\tilde{r} - (|h_1|^2 + |h_2|^2) \cdot \hat{c}\|^2. \quad (9)$$

Thus it follows that by using a simple linear combining, the decoding rule of equation (9) reduces to two separate, and much simpler, decoding rules for $C_1$ and $c_2$. When using a signaling constellation with 2b constellation points, this reduces the number of decoding metrics that have to be computed for ML decoding from $2^{2b}$ to $2 \times 2^b$.

When receiver 20 uses M receiver antennas, the received vector at antenna m is $$r_m = H_m \cdot c + \eta_m, \quad (10)$$

where the channel matrix $H_m$ is defined as $$H_m = \begin{bmatrix} h_{1m} & h_{2m} \\ h_{2m}^* & -h_{1m}^* \end{bmatrix}. \quad (11)$$

In this case, the optimum ML decoding rule is $$\hat{c} = \underset{\hat{c} \in C}{\operatorname{argmin}} \sum_{m=1}^{M} \|r_m - H_m \cdot \hat{c}\|^2, \quad (12)$$

and the corresponding uncertainty, $\Delta_c$, of the decoded symbols ĉ is defined by $$\Delta_c = \sum_{m=1}^{M} \|r_m - H_m \cdot \hat{c}\|^2. \quad (13)$$

As before, in the case of M receive antennas, the decoding rule can be simplified by premultiplying the received signal by $H_m^*$.

As indicated above, FIG. 1 shows two terminal units 10 and 30, and the issue that needs to be addressed is the detection performance at the base station receiver when the two terminal units synchronously transmit over the same time and frequency channel.

In the notation below, $g_{11}$ denotes the fading channel between transmit antenna 31 and receive antenna 21, $g_{12}$ denotes the channel between antenna 31 and antenna 22, $g_{21}$ denotes the channel between antenna 32 and antenna 21, and $g_{22}$ denotes the channel between antenna 32 and antenna 22. Also, $\{c_1, c_2\}$ and $\{s_1, s_2\}$ denote the two symbols transmitted from terminal units 10 and 30, respectively.

At receiver 20, the received signals over two consecutive symbol periods at receive antenna 21, $r_{11}$ and $r_{12}$, are $$r_{11} = h_{11}c_1 + h_{21}c_2 + g_{11}s_1 + g_{21}s_2 + \eta_{11} \quad (14)$$

$$r_{12} = -h_{11}c_2^* + h_{21}c_1^* - g_{11}s_2^* + g_{21}s_1^* + \eta_{12}. \quad (15)$$

Defining $r_1 = [r_{11} r_{12}^*]^T$, $c = [c_1 \ c_2]^T$, $s = [s_1 \ s_2]^T$, and $n_1 = [\eta_{11} \ \eta_{12}^*]^T$ equations (14) and (15) can be rewritten in matrix form as $$r_1 = H_1 \cdot c + G_1 \cdot s + n_1, \quad (16)$$

where the channel matrices $H_1$ and $G_1$ between the transmitter units 10 and 30 and receive antenna 21 are given by $$H_1 = \begin{bmatrix} h_{11} & h_{21} \\ h_{21}^* & -h_{11}^* \end{bmatrix}, \text{ and } G_1 = \begin{bmatrix} g_{11} & g_{21} \\ g_{21}^* & -g_{11}^* \end{bmatrix}. \quad (15)$$

The vector $n_1 = [\eta_{11} \eta_{12}^*]^T$ is a complex Gaussian random vector with zero mean and covariance $N_0 \cdot I$. Similarly, the received signals over two consecutive symbol periods at receive antenna 22, $r_{21}$ and $r_{22}$, are $$r_{21} = h_{12}c_1 + h_{22}c_2 + g_{12}s_1 + g_{22}s_2 + \eta_{21} \quad (16)$$

$$r_{22} = -h_{12}c_2^* + h_{22}c_1^* - g_{12}s_2^* + g_{22}s_1^* + \eta_{22}. \quad (17)$$

In a similar fashion, defining $r_2 = [r_{21} r_{22}^*]^T$ and $n_2 = [\eta_{21} \eta_{22}^*]^T$ equations (16) and (17) can be rewritten as $$r_2 = H_2 \cdot c + G_2 \cdot s + n_2, \quad (18)$$

where the channel matrices $H_2$ and are given by $$H_2 = \begin{bmatrix} h_{12} & h_{22} \\ h_{22}^* & -h_{12}^* \end{bmatrix}, \text{ and } G_2 = \begin{bmatrix} g_{12} & g_{22} \\ g_{22}^* & -g_{12}^* \end{bmatrix}. \quad (19)$$

Equations (14) and (18) can be combined to yield the matrix form $$r = \begin{bmatrix} r_1 \\ r_2 \end{bmatrix} = \begin{bmatrix} H_1 & G_1 \\ H_2 & G_2 \end{bmatrix} \begin{bmatrix} c \\ s \end{bmatrix} + \begin{bmatrix} n_1 \\ n_2 \end{bmatrix}. \quad (20)$$

Minimum Mean-Squared Error Interference Cancellation (MMSE IC)

When seeking to detect and decode signals $\{c_1, c_2\}$ by minimizing a mean-squared error criterion, the goal is find a linear combination of the received signals such that the mean-squared error in detecting the signals $\{c_1, c_2\}$ is minimized. In general terms, this can be expressed by an error cost function that is to be minimized, such as the function $$J(\alpha, \beta) = \left\| \sum_{i=1}^{4} \alpha_i^* r_i - (\beta_i^* c_1 + \beta_i^* c_2) \right\|^2 = \|\alpha^* \cdot r - \beta^* \cdot c\|^2, \quad (21)$$

where $r = [r_1\ r_2\ r_3\ r_4]^T = [r_{11}\ r_{12}\ r_{21}\ r_{22}]^T$.

One may note that a minimum is certainly reached when both $\alpha$ and $\beta$ are equal to 0, but that, of course, is not desired. Therefore, either $\beta_1$ or $\beta_2$ is set to 1.

When $\beta_1$ is set to 1, we get the following minimization criterion from equation (40)

$$J_1(\alpha_1, \beta_1) = \left\| \sum_{i=1}^{5} \alpha_{1i}^* r_{1i} - c_1 \right\|^2 = \|\tilde{\alpha}_1^* \tilde{r}_1 - c_1\|^2 = J_1(\tilde{\alpha}_1), \quad (22)$$

where $\tilde{\alpha}_1 = [\alpha_{11}, \alpha_{12}, \alpha_{13}, \alpha_{14}, -\beta_2] = [\alpha_1 - \beta_2]$ and $\tilde{r}_1 = [r^T c_2]^T$. From this it can be seen that $$\tilde{r}_1 = \begin{bmatrix} H & 0 \\ 0^T & 1 \end{bmatrix} \begin{bmatrix} \tilde{c} \\ c_2 \end{bmatrix} + \begin{bmatrix} n \\ 0 \end{bmatrix} = R \cdot d_1 + \tilde{\eta}, \quad (23)$$

where $0 = [0\ 0\ 0\ 0]^T$.

What is needed is to select $\tilde{\alpha}_1$ so that the expected value of the expression in equation (22) is minimized. That is, select $\tilde{\alpha}_1$ to minimize $$E\{J_1(\tilde{\alpha}_1)\} = E\{J_1(\tilde{\alpha}_1)\} = E\{(\tilde{\alpha}_1^* \tilde{r}_1 - c_1)(\tilde{\alpha}_1^* \tilde{r}_1 - c_1)^*\} \quad (24)$$
$$= \tilde{\alpha}_1^* E\{\tilde{r}_1 \tilde{r}_1^*\}\tilde{\alpha}_1 + E\{c_1 c_1^*\} - E\{\tilde{r}_1 c_1^*\}\tilde{\alpha}_1^* - E\{c_1 \tilde{r}_1\}\tilde{\alpha}_1.$$

Taking the partial derivative with respect to $\tilde{\alpha}_1$ and setting it to zero results in $$\begin{bmatrix} M & h_2 \\ h_2^* & 1 \end{bmatrix} \begin{bmatrix} \alpha_1^* \\ -\beta_2 \end{bmatrix} = \begin{bmatrix} h_1 \\ 0 \end{bmatrix}, \quad (25)$$

where $$M = HH^* + \frac{1}{\Gamma} I,$$

$\Gamma$ is the signal to noise ratio, I is the 4 by 4 identity matrix, $h_1$ is the first column of H, and $h_2$ is the second column of H. It follows that $$\alpha_1 = (M - h_2 h_2^*)^{-1} h_1 \text{ and } \beta_2^* = h_2^* (M - h_2 h_2^*)^{-1} h_1. \quad (26)$$

It can be shown that $$(M - h_2 h_2^*)^{-1} = M^{-1} + \frac{M^{-1} h_2 h_2^* M^{-1}}{1 - h_2^* M^{-1} h_2}, \quad (27)$$

which yields $$\beta_2^* = \frac{h_2^* M^{-1} h_1}{1 - h_2^* M^{-1} h_2}. \quad (28)$$

From the structure of the matrix H we can easily verify that $h_1$ and $h_2$ are orthogonal. Using this fact and the structure of the matrix M, it can be shown that)

$$\beta_2 = 0 \quad (29)$$

$$\alpha_1 = M^{-1} h_1. \quad (30)$$

Hence, the MMSE IC solution given by equations (29) and (30) will minimize the mean-squared error in $c_1$ without any regard to $c_2$. Considering the alternative cost function when $\beta_2$ is set to 1, a similar analysis leads to the conclusion that $$\beta_1 = 0 \quad (31)$$

$$\alpha_2 = M^{-1} h_2 \quad (32)$$

In this case, the MMSE IC solution given by equations (31) and (32) will minimize the mean-squared error in $c_2$ without any regard to $c_1$. Therefore, from equations (29)-(32), we can easily see that the MMSE interference canceller for signals from terminal unit 10 will consist of two different sets of weights $\alpha_1$ and $\alpha_2$ for $c_1$ and $c_2$, respectively. The weights for decoding signals from terminal 30 can be obtained in a similar fashion, as expected. Thus, the decoding of signals from terminal units 10 and 30 can be performed with a single subroutine MMSE.DECODE in decoder 25 as follows:

$(c, \Delta_c) = MMSE.DECODE)(r_1, r_2, H_1, H_2, G_1, G_2, \Gamma)$

{

$\tilde{r} = [r_1^T\ r_2^T]$ $\tilde{H} = \begin{bmatrix} H_1 & G_1 \\ H_2 & G_2 \end{bmatrix}$ $M = HH^* + \frac{1}{\Gamma} I$ $h_1 = [h_{11}\ h_{21}^*\ h_{12}\ h_{22}^*] = $ first column of $H$ $h_2 = [h_{21}\ -h_{11}^*\ h_{22}\ -h_{12}^*] = $ second column of $H$ $\alpha_1^* = M^{-1} h_1,\ \alpha_2^* = M^{-1} h_2$ $\hat{c} = \underset{\hat{c}_1, \hat{c}_2 \in C}{\operatorname{argmin}} \{\|\alpha_1^* \tilde{r} - \hat{c}_1\|^2 + \|\alpha_2^* \tilde{r} - \hat{c}_2\|^2\}$ $\Delta_c = \{\|\alpha_1^* \tilde{r} - \hat{c}_1\|^2 + \|\alpha_2^* \tilde{r} - \hat{c}_2\|^2\}$

}

With such a subroutine, both $\hat{s}$ and $\hat{c}$ can be estimated, as follows:

$$(\hat{c},\Delta)=MMSE.DECODE(r_1,r_2,H_1,H_2,G_1,G_2,\Gamma) \quad (33)$$

$$(\hat{s},\Delta)=MMSE.DECODE(r_1,r_2,G_1,G_2,H_1,H_2,\Gamma) \quad (34)$$

Additional improvement can be realized by employing a two-step interference cancellation approach. In this two-step approach, the receiver decodes signals from both terminals using the subroutine MMSE.DECODE disclosed above. Assuming that symbols from the terminal unit 10 $\hat{c}_o$ have been decoded correctly, the receiver can, then, perfectly cancel the contribution of the terminal unit 10 in the received signal vectors $r_1$ and $r_2$. The receiver then uses $x_1$ and $x_2$, the received signal vectors after canceling signals from terminal unit 10, to re-decode symbols $\hat{s}_o$ from terminal unit 30 using the optimum ML decoding rule in equation (10). Assuming that the symbols from terminal unit 10 have been decoded correctly, the performance for terminal unit 30 will be equivalent to that with 2 transmit and 2 receive antennas (which is equivalent to 4 branch MRC diversity). The receiver then repeats the above step assuming that symbols from terminal unit 30 $\hat{s}_1$ have been decoded correctly using the MMSE.DECODE subroutine. As before, the receiver cancels the contribution of terminal unit 30 in the received signal vectors $r_1$ and uses $y_1$ and $y_2$, the received signal vectors after cancelling signals from terminal unit 30, to re-decode symbols from terminal unit 10 $\hat{c}_1$ using the optimum ML decoding rule in equation (10). Also as before, assuming that symbols from terminal unit 30 have been decoded correctly, the performance for terminal unit 10 will be equivalent to that with 2 transmit and 2 receive antennas. Letting $\Delta_0=\Delta_{c_0}+\Delta_{s_0}$ and $\Delta_1=\Delta_{c_1}+\Delta_{s_1}$ denote the overall uncertainty for $\hat{c}_0$ and $\hat{s}_0$, and for $\hat{c}_1$ and $\hat{s}_1$, respectively, the receiver compares the overall uncertainty and chooses the pair $(\hat{c}_o, \hat{s}_o)$ if $\Delta_o<\Delta_1$, and $(\hat{c}_1,\hat{s}_1)$ otherwise. The two-step interference cancellation and ML decoding algorithm is presented below in pseudo-code subroutine II.MMSE.DECODE.

$$(\hat{c}, \hat{s}) = II.DECODE(r_1, r_2, H_1, H_2, G_1, G_2, \Gamma)$$

{

$\quad (\hat{c}_0, \Delta_{c,o}) = MMSE.DECODE(r_1, r_2, H_1, H_2, G_1, G_2, \Gamma)$ $\quad x_1 = r_1 - H_1 \cdot \hat{c}_o, \; x_2 = r_2 - H_2 \cdot \hat{c}_o$ $\quad F(s) = \|x_1 - G_1 \cdot s\|^2 + \|x_2 - G_2 \cdot s\|^2$ $\quad \hat{s}_o = \underset{s \in S}{\mathrm{argmin}}(F(s)), \; \Delta_{s,o} = F(s)$ $\quad (\hat{s}_1, \Delta_{s,1}) = MMSE.DECODE(r_1, r_2, G_1, G_2, H_1, H_2, \Gamma)$ $\quad y_1 = r_1 - G_1 \cdot \hat{s}_1, \; y_2 = r_2 - G_2 \cdot \hat{s}_1$ $\quad F(c) = \|y_1 - H_1 \cdot c\|^2 + \|y_2 - H_2 \cdot c\|^2$ $\quad \hat{c}_1 = \underset{c \in C}{\mathrm{argmin}}(F(c)), \; \Delta_{c,1} = F(c)$ $\quad$ If $(\Delta_{c,o} + \Delta_{s,o}) < (\Delta_{c,1} + \Delta_{s,1})$ $\quad\quad (\hat{c}, \hat{s}) = (\hat{c}_o, \hat{s}_o)$ $\quad$ Else $\quad\quad (\hat{c}, \hat{s}) = (\hat{c}_1, \hat{s}_1)$

}

With appreciation of the above-disclosed theoretical background, we realized that enhanced performance is attained by devoting the space-time block coding to interference cancellation and ML decoding, while another coding schema may be used to overcome channel-caused degradations, such as fading. Accordingly, each of the transmitters in FIG. 1 includes a channel coder (14 and 34, respectively) that is interposed between the input signal and the transmitter's space-time block coder. Channel coders 14 and 24 can employ any conventional channel error correcting code (for example a trellis code, or a convolutional code).

At receiver 20, the inner space-time block code is decoded in element 26 and is used to suppress interference from the various co-channel terminals, using the MMSE approach disclosed above. Element 26 forms the two interference canceling vectors $\alpha_{i1}$ and $\alpha_{t1}$ corresponding to some terminal, i, and element 27 forms the two decision variables $$\xi_1=\alpha_1^* r \text{ and } \xi_2=\alpha_2^* r \quad (35)$$

Those decisions, however, are used as soft decisions of the transmitted information symbols, and are fed to channel decoder 28, which is a conventional decoder that corresponds to the type of encoding performed in channel encoders 14 and 34. Thus, in the arrangement depicted in FIG. 1, the structure of an inner coder is used for interference suppression, such that many co-channel terminals can operate simultaneously while providing diversity. The output of the inner code space-time decoder forms the input to the outer coder decoder, which decides on the transmitted information while providing protection against channel errors.

FIG. 2 presents an arrangement for increasing the data rate or throughput in wireless systems. In FIG. 2, the information to be transmitted is demultiplexed in element 40 into two streams. One stream is applied to channel encoder 41, and the other stream is applied to channel encoder 51. The output of channel encoder 41 is applied to space-time block encoder 42, and then to mapper and pulse shaper 43 and antennas 44 and 45. Similarly, the output of channel encoder 51 is applied to space-time block encoder 52, and then to mapper and pulse shaper 53 and antennas 54 and 45. Generalizing, information symbols from a transmitting terminal are split into L parallel streams. Stream l is then encoded using a channel code with rate $R_l$ and then coded with a space-time block encoder with N transmitting antennas. The coding rates can be the same, but an advantage accrues when the coding rates are chosen such that $R_1<R_2, <\ldots, <R_L$. In such a case, symbols transmitted in stream 1 will have better immunity against channel errors as compared to symbols transmitted in stream u where u>1. The base station receiver is assumed to be equipped with at least L receive antennas. The base station receiver treats each stream as a different user and uses the iterative interference cancellation techniques disclosed above, or the ones disclosed in the aforementioned '163 application. Since the first stream has the smallest coding rate $R_l$, it has the best immunity against the channel errors and most likely it will be error free. The receiver then uses the decoded symbol of stream 1 to subtract the contributions of the first stream in the total received signals, while decoding the remaining L–1 streams. In decoding the remaining L–1 streams, the decoder decodes signals from the second stream first, since it has the best immunity against channel errors among the remaining L–1 streams (due to its lowest rate, $R_2$ from among the remaining streams). Then the receiver uses the decoded symbols for the second stream to cancel out its contribution in the received signal. This process is repeated until all streams are decoded.

It can be shown that, in this case, the system throughput is given by $$\rho = \frac{1}{L}\sum_{l=1}^{L} R_l(1 - FER_l), \quad (36)$$

where $FER_l$ is the frame error rate of stream l.

We claim:

1. An arrangement comprising a base station and K remote stations that communicate to said base station over a given frequency channel, characterized in that:
   remote station j, j=1, 2, . . . K, includes
   a first encoder that encodes data with a channel code selected for remote station j to form a first encoded signal;
   a second encoder that encodes the first encoded signal with a space-time block code selected for remote station j to form a second encoded signal of N symbols in each block of L time intervals; and
   a module that conditions said second encoded signal and transmits the conditioned signal, over N>1 transmitting antennas to said base station, synchronized in time with transmissions by others of said K remote stations; and
   said base station employs M≧K antennas to receive the signals transmitted by said K remote stations.

2. The arrangement of claim 1 where said base station comprises
   a first module responsive to signals received by said M antennas for performing, relative to each of the K remote stations, a detection process that employs minimum mean-squared error interference cancellation principles to obtain a best estimate of the N symbols transmitted by said each remote station in each block of L time intervals; and
   a second module that, employing the best-estimate symbols that are obtained by said first module channel for said each of the K remote stations, performs decoding to reverse the encoding performed in said each of the K remote stations.

3. The arrangement of claim 2, wherein K=2, the arrangement thus having a first remote station and a second remote station, the number of transmitting antennas that each of the remote station has is 2 (N=2), and the first module executes a two-step algorithm expressed by:

$$(\hat{c}, \hat{s}) = H.DECODE(r_1, r_2, H_1, H_2, G_1, G_2, \Gamma)$$
$$\{$$
$$(\hat{c}_0, \Delta_{c,o}) = MMSE.DECODE(r_1, r_2, H_1, H_2, G_1, G_2, \Gamma)$$
$$x_1 = r_1 - H_1 \cdot \hat{c}_o, \; x_2 = r_2 - H_2 \cdot \hat{c}_o$$
$$F(s) = \|x_1 - G_1 \cdot s\|^2 + \|x_2 - G_2 \cdot s\|^2$$
$$\hat{s}_o = \operatorname*{argmin}_{s \in S}(F(s)), \; \Delta_{s,o} = F(s)$$
$$(\hat{s}_1, \Delta_{s,1}) = MMSE.DECODE(r_1, r_2, G_1, G_2, H_1, H_2, \Gamma)$$
$$y_1 = r_1 - G_1 \cdot \hat{s}_1, \; y_2 = r_2 - G_2 \cdot \hat{s}_1$$
$$F(c) = \|y_1 - H_1 \cdot c\|^2 + \|y_2 - H_2 \cdot c\|^2$$
$$\hat{c}_1 = \operatorname*{argmin}_{c \in C}(F(c)), \; \Delta_{c,1} = F(c)$$
If $(\Delta_{c,o} + \Delta_{s,o}) < (\Delta_{c,1} + \Delta_{s,1})$
$$(\hat{c}, \hat{s}) = (\hat{c}_o, \hat{s}_o)$$
Else
$$(\hat{c}, \hat{s}) = (\hat{c}_1, \hat{s}_1)$$
$$\}$$

where $r_1$ is a vector of signals received at said first antenna of said base station, $r_2$ is a vector of signals received at said second antenna of said base station, $H_1$ is a matrix of transfer coefficients between said first remote station and said first antenna of said base station, $H_2$ is a matrix of transfer coefficients between said first remote station and said second antenna of said base station, $G_1$ is a matrix of transfer coefficients between said second remote station and said first antenna of said base station, $G_2$ is a matrix of transfer coefficients between said second remote station and said second antenna of said base station, and $\Gamma$ is the signal to noise ratio.

4. The arrangement of claim 2, wherein K=2, the arrangement thus having a first remote station and a second remote station, the number of transmitting antennas that each of the remote stations has is 2 (N=2), and the first module executes the following:
   (1) executing a process for developing estimates of signals $\hat{s}_i$ of signals $s_i$, i=1, 2, transmitted by the first remote station by
      (a) computing $F_i(s) = \|x_{1,i} - G_1 \cdot s\|^2 + \|x_{2,i} - G_2 \cdot s\|^2$, where $x_{1,i} = r_1 - H_1 \cdot \hat{c}_i$, $x_{2,i} = r_2 - H_2 \cdot \hat{c}_i$, and $\hat{c}_i$ is estimate of symbol $c_i$ sent by said first transmitter,
      (b) choosing $\hat{s}_i$ according to
      $$\hat{s}_i = \operatorname*{argmin}_{s \in S}(F(s)),$$
      and
      (c) setting $\Delta_{s,i}$ to $F_i(s)$,
   (2) executing a module for developing estimates $\hat{c}_i$ of signals $c_i$, i=1, 2, transmitted by the second remote station by
      (a) computing $F_i(c) = \|y_{1,i} - G_1 \cdot c\|^2 + \|y_{2,i} - G_2 \cdot c\|^2$, where $y_{1,i} = r_1 - H_1 \cdot \hat{s}_i$, $y_{2,i} = r_2 - H_2 \cdot \hat{s}_i$, and $\hat{s}_i$ is estimate of symbol $s_i$ sent by said second transmitter,
      (b) choosing $\hat{c}_i$ according to
      $$\hat{c}_i = \operatorname*{argmin}_{c \in C}(F(c)),$$
      and
      (c) setting $\Delta_{s,i}$ to $F_i(c)$,
   (3) choosing pair $(\hat{c}_o, \hat{s}_0)$ if $(\Delta_{c,0} + \Delta_{s,0}) < (\Delta_{c,1} + \Delta_{s,1})$ and pair $(\hat{c}_1, \hat{s}_1)$ otherwise; and
   (4) repeating steps (1)-(3);
   where $r_1$ is a vector of signals received at said first antenna of said base station, $r_2$ is a vector of signals received at said second antenna of said base station, $H_1$ is a matrix of transfer coefficients between said first remote station and said first antenna of said base station, $H_2$ is a matrix of transfer coefficients between said first remote station and said second antenna of said base station, $G_1$ is a matrix of transfer coefficients between said second remote station and said first antenna of said base station, and $G_2$ is a matrix of transfer coefficients between said second remote station and said second antenna of said base station.

5. The arrangement of claim 1 where said base station comprises
- a first module responsive to said M antennas for performing, relative to each of the K remote stations, a detection process that employs minimum mean-squared error interference cancellation principles to obtain a tentative estimate of the N symbols transmitted by said each remote station in each block of L time intervals;
- a second module that, employing the tentative estimates developed by said first module, for performing, relative to each of the K remote stations, a detection process that employs minimum mean-squared error interference cancellation principles to obtain a final estimate of the N symbols transmitted by said each remote station in each block of L time intervals; and
- a third module that, relative to the final-estimate symbols that are obtained by said first module channel for said each of the K remote stations, performs decoding to reverse the encoding performed in said each of the K remote stations.

6. The arrangement of claim 1, where said K remote stations are combined to form a single transmitting station, with a module that demultiplexes an input signal into K streams that are respectively applied to said K remote stations.

7. The arrangement of claim 6 where coding rates of said remote stations are not restricted to be the same.

8. The arrangement of claim 6 where coding rates $R_j$ of said remote stations, $j=1, 2, \ldots, K$, are such that $R_1 < R_2 < \ldots < R_K$.

9. An arrangement comprising a base station and K remote stations that communicate to said base station over a given frequency channel, characterized in that:
- each of the remote stations
  - encodes data with a channel code,
  - encodes results of the encoding with the channel code with a space-time block code; and
  - transmits results of the space-time block encoding transmits to said base station over N antennas, synchronized in time with transmissions by others of said K remote stations; and
- said base station employs $M \geq K$ antennas to receive the signals transmitted by said K remote stations, and employs decoding modules to decode the signals transmitted by said K remote stations and received by said M antennas.

* * * * *

UNITED STATES PATENT AND TRADEMARK OFFICE
CERTIFICATE OF CORRECTION

PATENT NO. : 8,422,587 B2
APPLICATION NO. : 13/365079
DATED : April 16, 2013
INVENTOR(S) : Arthur Robert Calderbank et al.

Page 1 of 1

It is certified that error appears in the above-identified patent and that said Letters Patent is hereby corrected as shown below:

In the Claims

In column 12, line 24, please delete "of signals";

In column 13, line 7, please replace "said each" with --each said--.

Signed and Sealed this
Twentieth Day of May, 2014

Michelle K. Lee
*Deputy Director of the United States Patent and Trademark Office*